3,397,237
PROCESS FOR PREPARING METHYL-DIALKYL-AMINES

John E. Jackson, Geneseo, N.Y., assignor, by mesne assignments, to Ashland Oil and Refining Company, a corporation of Kentucky
No Drawing. Filed June 10, 1965, Ser. No. 463,022
2 Claims. (Cl. 260—583)

ABSTRACT OF THE DISCLOSURE

Methyl dialkyl tertiary amines are produced by reacting a dialkyl secondary amine, such as dihydrogenated tallow amine, with methanol at elevated temperatures, e.g., 350°–450° F., and elevated pressures, e.g., from autogenous pressure up to 100 p.s.i.g., in the presence of a salt of chromous acid, e.g., copper chromite, and an alkaline earth oxide, e.g., calcium oxide.

---

This invention relates to a novel process for the preparation of tertiary amines and, more particularly, to the preparation of methyl dialkyl tertiary amines from secondary amines and methyl alcohol as a methylating agent in the presence of a novel catalyst combination.

The prior art discloses various procedures for producing tertiary amines. U.S. Patent No. 2,776,314 discloses the preparation of methyl dialkyl amines utilizing formaldehyde and formic acid in the presence of sulfuric acid. U.S. Patent No. 2,073,671 discloses the preparation of tertiary amines by reacting an alcohol such as methanol with a secondary amine in the presence of a catalyst containing a phosphorus compound on a suitable carrier. U.S. Patent No. 2,043,965 discloses the reaction of aliphatic alcohols having at least 8 carbon atoms, with various amines in the presence of a catalyst capable of splitting off water. U.S. Patents Nos. 1,993,542; 2,636,902; and 3,091,641 also disclose processes of reacting alcohols and various amines in the presence of catalysts.

The reaction of this invention can be represented by the following equation:

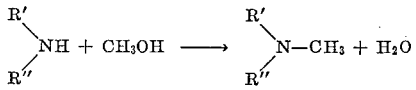

wherein R′ and R″ each represents an alkyl group or an aralkyl group or cycloalkyl group, the alkyl portion or group containing 8 to 24 carbon atoms.

The process of the invention is carried out advantageously in an autoclave at pressures up to about 1000 p.s.i.g. and at elevated temperatures preferably about 350°–450° F. The period of time required for the reaction will vary according to reaction conditions. However, periods of time up to about 16 hours may be required.

The novel catalyst combination employed in the process of the invention comprises a salt of chromous acid wherein a monovalent chromite radical is available, in combination with an alkaline earth oxide. Preferably, the catalyst combination comprises copper chromite and calcium oxide. The effective amount of the catalyst combination to be used will vary with the particular reactants and the catalyst used. For example, about 2.5% to 5% copper chromite and about 5% to 15% calcium oxide (both percentages based on the weight of the secondary amine) have been found effective.

The amount of methylating agent (methyl alcohol) used in the process of the invention will vary in the range from about the theoretical amount required up to about 200% excess.

The process of the invention is not a reductive alkylation, at least insofar as it is understood. No hydrogen is explicitly added to the reaction either directly as a gas or indirectly as labile hydrogen in one of the usual organic compounds such as formic acid, which are known to make hydrogen available by decomposition for reduction in the presence of hydrogenation-dehydrogenation catalysts.

The alkaline earth oxide, i.e., calcium oxide used in the catalyst combination with the chromite salt, in the amounts found to be effective in the process, is not a promoter of the chromite salt in the sense known in the prior art. Instead, it is intended to, and actually appears to, take part in the reaction by effectively combining with some of the water evolved in the reaction mechanism, thus forcing the equilibrium to the right in the equation shown above.

The products of this invention are useful in any of the usual applications of tertiary amines. They are particularly useful as intermediates for preparing quaternary amine compounds low in ash, since contaminating salts characteristic of the prior art quaternization processes are eliminated when a tertiary amine is reacted with an alkyl chloride to form a quaternary.

The following examples will illustrate the invention, but they are not intended to be limiting in any sense.

EXAMPLE I

One gram molecular weight of a fatty secondary amine, a dihydrogenated tallow amine (wherein the tallow comprises 35% $C_{16}$ and 65% $C_{18}$), 5% by weight of copper chromite (25 gm.), 10% by weight of calcium oxide (50 gm.) and 2 moles (64 gm.) of methanol were charged to a stirred autoclave and heated at 400° F. for a period of 15¼ hours. Pressure reached 760 p.s.i.g. during the course of the reaction. At the end of 8 hours, a sample filtered free of catalyst and stripped of excess methanol, analyzed as containing 2.34% tertiary nitrogen. At the end of 15.25 hours further increase in tertiary nitrogen content had stopped. The product contained 2.68% tertiary nitrogen. Total nitrogen was 2.72%. Yield of tertiary amine was 98% based on a total nitrogen content of 2.88% in the starting material to give a theoretical possible tertiary N of about 2.73%. The product was water white.

EXAMPLE II

The reaction of Example I was repeated except that calcium oxide was omitted from the reaction mixture. After 7 hours at 400° F., during which the maximum pressure which was reached was 360 p.s.i.g., tertiary amine N content had reached 0.50%, and after 11 hours it had reached only 0.57%.

EXAMPLE III

The reaction of Example I was repeated except that copper chromite was omitted from the reaction mixture. After 5¼ hours at 400° F., during which the maximum pressure attained was 300 p.s.i.g., the content of tertiary amine nitrogen was 0.38%.

EXAMPLE IV

Copper chromite to the extent of 2.5% (12.5 grams) was added to the reaction mixture of Example III and in 5.5 hours additional reaction time at 400° F., during which the pressure rose to 300 p.s.i.g., the content of tertiary amine nitrogen increased to 2.17%. In 24 hours it increased to 2.50%.

EXAMPLE V

The reaction of Example I was repeated except that 2.5% (12.5 grams) of calcium oxide was used instead of 10% calcium oxide. After 14 hours at 400° F., during which the pressure reached a maximum of 400 p.s.i.g., the content of tertiary amine nitrogen had reached 1.09%.

EXAMPLE VI

The reaction of Example I was repeated except that 2.5% (12.5 grams) of copper chromite was used in place of 5% copper chromite. After 8 hours at 400° F., during which the maximum pressure which was reached was 400 p.s.i.g., the content of tertiary amine nitrogen reached 0.96%. After 13.5 hours, tertiary amine nitrogen was 0.95%.

EXAMPLE VII

The reaction of Example I was repeated except that 12.5% of calcium oxide (62.5 grams) was used instead of 10% calcium oxide. After 2 hours at 380° F., during which the pressure had reached 700 p.s.i.g., the content of tertiary amine nitrogen was 1.95%. After 3 hours it was 2.04%. After 5 hours of reaction time, the pressure was vented to 50 p.s.i.g., then allowed to build up to 240 p.s.i.g. during an additional 6 hours of reaction time. At the end of this time, a total of 9 hours, the content of tertiary amine nitrogen was 2.40%.

EXAMPLE VIII

The reaction of Example I was repeated using three moles of methanol instead of 2 moles. At the end of 14 hours at 400° F., during which the pressure reached 400 p.s.i.g., the content of tertiary amine nitrogen was 0.99%.

EXAMPLE IX

The reaction of Example I was repeated except that after 4 hours at 300° F., during which the pressure reached 160 p.s.i.g. and the content of tertiary amine nitrogen reached 1.90%, the reaction vessel was vented to release pressure and 2 moles additional of methanol was added. After an additional 10.5 hours at 350° F., during which the pressure rose to 350 p.s.i.g., the content of tertiary amine nitrogen had reached 2.53%.

EXAMPLE X

The reaction of Example I was repeated using 1% (5 grams) of copper chromite and 5% (25 grams) of calcium oxide. After 19 hours at 400° F., during which the pressure reached a maximum of 360 p.s.i.g., the content of tertiary amine nitrogen had reached 1.25%.

EXAMPLE XI

The reaction of Example X was repeated using 1.2 moles of methanol and 5% (25 grams) of calcium hydroxide instead of calcium oxide. After 14 hours at 390° F., during which the pressure reached 200 p.s.i.g., the content of tertiary amine nitrogen was 0.84%.

EXAMPLE XII

One gram molecular weight (500 gm.) of the fatty secondary amine of Example I, 2.5% (25 grams) of Raney nickel (dry wt.—methanol washed), 5% (50 gms.) of xylol and 2 moles (64 gms.) of methanol were charged to a pressure reaction vessel. After 18 hours at 450° F., during which the pressure rose to a maximum of 1000 p.s.i.g., the content of tertiary amine nitrogen had reached 1.49%.

EXAMPLE XIII

One gram molecular weight (500 gm.) of the fatty secondary amine of Example I, 2% (10 gms.) of Raney nickel (dry wt.—methanol washed), 10% (50 gms.) of calcium oxide and 2 moles (64 gms.) of methanol were charged to a stirred autoclave and heated to 395°–400° F. After 8 hours, during which the pressure rose to 470 p.s.i.g., the content of tertiary amine nitrogen was 1.81%. After 12 hours it was 1.83%.

EXAMPLE XIV

Four hundred seventy-seven grams (approx. 1.7 moles) of lauryl benzyl amine, 5% (23.8 gms.) of copper chromite, 10% (47.7 gms.) of calcium oxide and 2.01 moles (64.5 gms.) of methanol were charged to a stirred autoclave and heated to 400° F. After 7.5 hours, during which the pressure rose to 700 p.s.i.g., the content of tertiary amine nitrogen had reached 1.91%. The used catalyst was then filtered off and to 320 grams of the partially converted filtrate were added 5% (16 gms.) copper chromite, 10% (32 gms.) calcium oxide and 1.35 moles (43.2 gms.) of methanol. After 16 hours at 400° F., during which the maximum pressure which was reached was 780 p.s.i.g., the content of tertiary amine nitrogen had reached 4.46%. Theory was calculated to be 4.75% tertiary amine nitrogen.

EXAMPLE XV

The reaction of Example I was repeated, venting the autoclave as required to maintain pressure at 200 to 400 p.s.i.g. After 14 hours at 400° F., the content of tertiary amine nitrogen was 2.58%.

The embodiments of the present invention in which an exclusive property or privilege is claimed are defined as follows:

1. A process for producing a methyl dialkyl tertiary amine, which comprises reacting a dialkyl secondary amine, the alkyl groups of which have 8–24 carbon atoms, with an amount of methanol ranging from stoichiometric up to 200% excess, at 350°–450° F. and at elevated pressures ranging from autogenous pressure up to 1000 p.s.i.g., in the presence of 2.5% to 5% copper chromite and 5% to 10% calcium oxide, said percentages being percent by weight based on the weight of said dialkyl secondary amine.

2. The process of claim 1 wherein said dialkyl secondary amine is a dihydrogenated tallow amine.

References Cited

UNITED STATES PATENTS 3,223,734   12/1965   Fallstad et al. __ 260—570.9 XR CHARLES B. PARKER, *Primary Examiner.*

ROBERT V. HINES, *Assistant Examiner.*